United States Patent Office 2,701,181
Patented Feb. 1, 1955

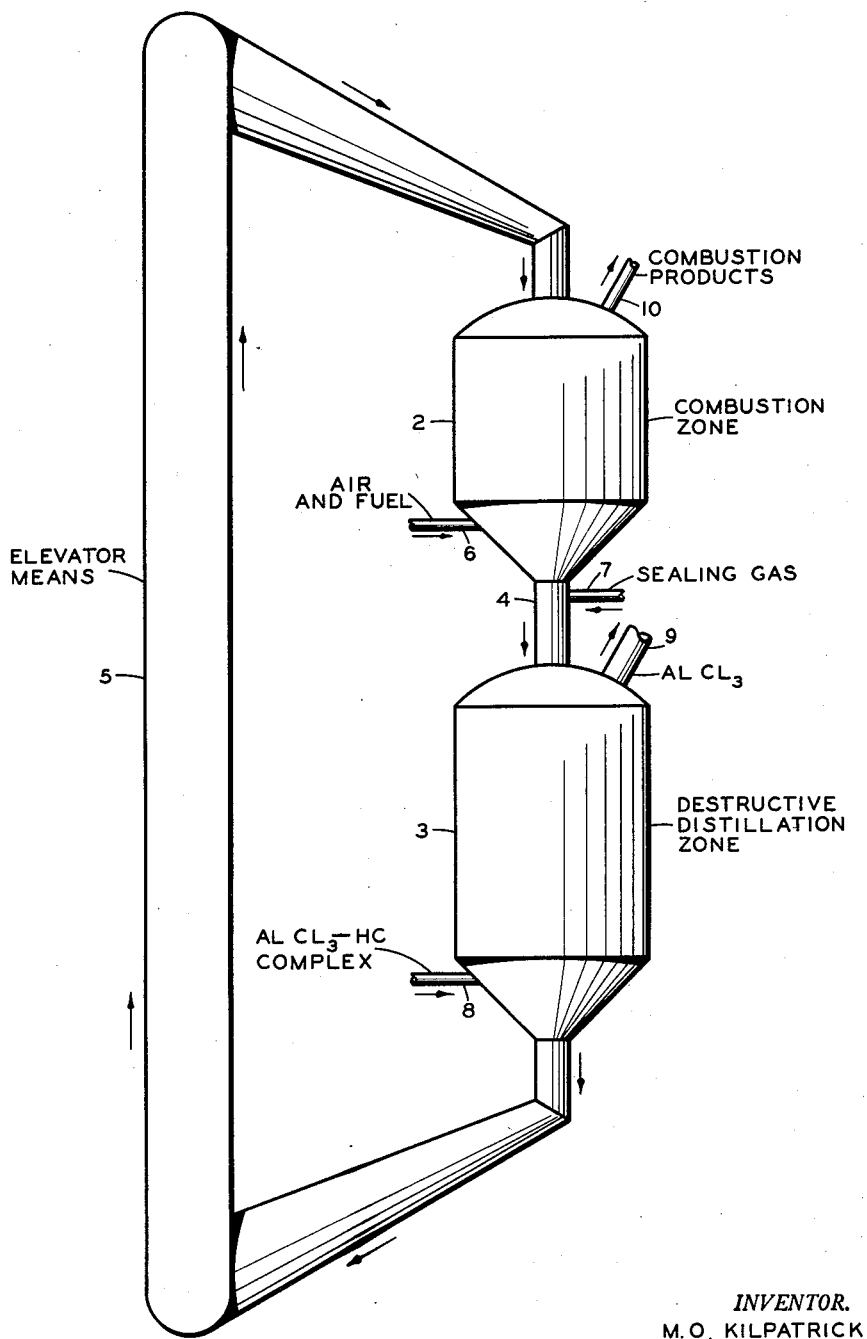

2,701,181

RECOVERY OF ALUMINUM HALIDES

Myron O. Kilpatrick, Bartlesville, Okla., assignor to Phillips Petroleum Company, a corporation of Delaware Application October 16, 1951, Serial No. 251,556

2 Claims. (Cl. 23—96)

This invention relates to the recovery of aluminum halide catalysts. In one aspect it relates to the recovery of an aluminum halide from an aluminum halide-hydrocarbon complex. In another aspect it relates to the removal of coke from a destructive distillation zone in which an aluminum halide is recovered from an aluminum halide-hydrocarbon complex. In another aspect it relates to the reduction or elimination of corrosion in a system in which an aluminum halide is recovered from an aluminum halide-hydrocarbon complex.

Aluminum halides are well-known catalysts for hydrocarbon conversions and other organic reactions. Aluminum halides used for this purpose are aluminum chloride, aluminum bromide, aluminum chlorofluorides, aluminum fluorobromides, and aluminum chlorobromides. These aluminum halides are frequently used as aluminum halide-hydrocarbon complexes. The halides mentioned are not equivalents. The particular aluminum halide used must be chosen to suit the particular requirements of the process in which it is to be used. In hydrocarbon conversion systems in which such complexes are used, the volume of the complex continuously increases and part of said complex must be withdrawn from the system.

It is very desirable to recover the aluminum halide from the withdrawn complex whenever possible. In the past, recovery on a commercial scale has been difficult because either the aluminum chloride is only partially recovered or, when recovery approaching total recovery is obtained by destructive distillation, a coke-like residue remains in the distillation zone and is extremely difficult to remove. Furthermore, the recovery of aluminum halides from such complexes by destructive distillation has been accompanied by severe corrosion of metallic equipment.

In accordance with this invention, an aluminum halide is recovered from an aluminum halide-hydrocarbon complex by contacting the complex with a moving bed of refractory particulate solids at an elevated temperature sufficient to sublime aluminum halide and recover it from the complex by destructive distillation. The sublimed halide may then be condensed and recovered by any suitable means. The temperature of the contacting or destructive distillation is generally in the range of 500 to 1000° F., and more preferably 700 to 1000° F. The pressure is generally in the range of 1 to 50 p. s. i. a, preferably 5 to 25 p. s. i. a., and more preferably 5 to 15 p. s. i. a. The process of the invention is conveniently carried out in an apparatus of the pebble heater type in which the aluminum halide-hydrocarbon complex is contacted with a downwardly moving continuous bed of particulate refractory pebbles at a temperature of 500 to 1000° F. The pebbles may be made of refractory materials such as silica, zirconia, mullite, high-melting metals, and the like. Contact with the hot pebbles releases the aluminum halide from the complex in the form of a vapor, which is withdrawn and condensed. The coke-like residue which is formed in the destructive distillation is distributed over the surface of the particulate solid and removed from the distillation zone along with the solids or pebbles. The coked pebbles are then passed to a combustion zone in which the coke is removed from the pebbles by combustion, either by contacting with oxygen or air or by contacting with a combustible, oxidizing mixture of fuel gas and air. The combustion of the coke raises the temperature of the pebbles to a value in the range of 1000 to 2000° F., depending upon the amount of coke present, the proportion of air and/or fuel gas used and other factors. The pebbles from which coke has been thus removed are then passed again to the destructive distillation zone and recontacted with aluminum halide-hydrocarbon complex. Since the pebbles are ordinarily made of ceramic material and since the pebble heater is preferably lined with a ceramic material, corrosion of metal equipment is greatly reduced. Furthermore, by the use of a large continuous moving bed of refractory pebbles, the problem of coke removal from the distillation zone is conveniently solved.

The drawing is a flow diagram of one embodiment of this invention. A continuous bed of refractory pebbles moves from combustion zone 2 downwardly through connecting throat 4 into destructive distillation zone 3. The temperature of the pebbles leaving the combustion zone is preferably 1000 to 1500° F. A fluid aluminum chloride-hydrocarbon complex, such as that customarily withdrawn from a hydrocarbon alkylation or isomerization zone, is passed through inlet 8 into destructive distillation zone 3, in which the complex contacts the hot pebbles and is subjected to destructive distillation. Vapor, comprising sublimed aluminum chloride together with hydrocarbon cracking products and hydrogen chloride, is removed from the system through outlet 9 and is passed to any suitable condensation equipment for the recovery of aluminum chloride, hydrogen chloride and/or hydrocarbon products. Hydrogen halide may be added through inlet 8 to suppress aluminum halide decomposition. The aluminum chloride may be condensed and contacted with a stream of hydrocarbon material flowing to a hydrocarbon conversion zone, such as an alkylation or isomerization zone.

During the destructive distillation in zone 3 at least part of the hydrocarbon material in the complex is converted to coke which is deposited on the surface of the pebbles. The coked pebbles, at a temperature of 500 to 600° F. are passed to elevator means 5 and conveyed to combustion zone 2.

In combustion zone 2 the coked pebbles are contacted with air or oxygen or a mixture of air or oxygen with a fuel gas, such as methane, hydrogen or carbon monoxide. The oxygen or oxygen-fuel mixture enters combustion zone 2 at a comparatively low point through inlet 6. The air or oxygen contacts the coked pebbles countercurrently and the combustion products are withdrawn through outlet 10. If desired, the combustion may be conducted in such a manner as to convert the coke predominantly to carbon monoxide, which may be used as a fuel gas. The combustion heats the pebbles again to a temperature in the range 1000 to 2000° F., and the pebbles are returned, as previously described, to the destructive distillation zone.

Since aluminum chloride readily reacts with water, care should be taken to exclude water from destructive distillation zone 3. One advantageous method for accomplishing this result is to add a sealing gas through inlet 7 at an intermediate point in throat 4. This sealing gas may be any inert gas, such as nitrogen, methane, hydrogen, carbon dioxide, etc. It is added at a sufficient pressure so that no combustion gas from zone 2 will flow downward into zone 3. That method is particularly desirable if a fuel gas such as methane, which on combustion produces water, is used in combustion zone 2.

Reasonable variation and modification are possible within the scope of the foregoing disclosure, the drawing and the appended claims to the invention the essence of which is that an aluminum halide-hydrocarbon complex is contacted with a moving bed of hot refractory particulate solids maintained at such a temperature as to sublime the aluminum halide and remove it from the sludge by destructive distillation, removing the solids together with coke deposited thereon from the system, and recovering the sublimed aluminum halide.

I claim:

1. A process for recovering an aluminum halide from an aluminum halide-hydrocarbon complex which comprises maintaining a mass of ceramic pebbles within a distillation zone and a combustion zone each defined by a wall of ceramic material, continuously transferring pebbles from the lower end of said distillation zone to the upper end of said combustion zone and from the lower end of said combustion zone to the upper end of said distillation zone at such a rate as to maintain a continuous circulation of pebbles through the system with a slow gravitation or settling of pebbles in said zones effected without impact of the pebbles against said ceramic walls, introducing an aluminum halide-hydrocarbon complex in the fluid state into said distillation zone, said complex being non-corrosive to said ceramic walls and pebbles, said pebbles entering the distillation zone substantially free from carbonaceous deposits and at a temperature within the range of 1000 to 1500° F., whereby said complex is distilled into a gaseous stream, composed of said aluminum halide and light hydrocarbons, and a heavy carbonaceous residue, which is deposited on said pebbles, withdrawing said gaseous stream as a product from a high point in said distillation zone, withdrawing said residue substantially wholly as a deposit on said pebbles as a result of the aforesaid slow gravitation or settling of said pebbles in the distillation zone, introducing an oxygen-containing gas and sufficient fuel at a low point in said combustion zone to burn off substantially all of said carbonaceous residue and heat the pebbles leaving said combustion zone to a temperature within the aforesaid range of 1000 to 1500° F., said fuel producing water as a product of combustion, withdrawing combustion products at a high point in said combustion zone, and introducing an inert gas free from water vapor into the pebbles leaving the combustion under such conditions as to cause it to flow into the combustion zone at such velocity as to prevent entrance of said water into the distillation zone.

2. A process according to claim 1 wherein said complex is an aluminum chloride-hydrocarbon complex.

References Cited in the file of this patent

UNITED STATES PATENTS

| | | |
|---|---|---|
| 2,254,618 | McMillan et al. | Sept. 2, 1941 |
| 2,293,891 | Evering et al. | Aug. 25, 1942 |
| 2,448,922 | Simpson et al. | Sept. 7, 1948 |
| 2,485,050 | Hepp et al. | Oct. 18, 1949 |
| 2,508,292 | Porter et al. | May 16, 1950 |
| 2,518,842 | Weber | Aug. 15, 1950 |
| 2,551,905 | Robinson | May 8, 1951 |
| 2,567,207 | Hoge | Sept. 11, 1951 |
| 2,577,591 | Sailors | Dec. 4, 1951 |